United States Patent Office 2,714,579
Patented Aug. 2, 1955

2,714,579

LUBRICATING OIL ADDITIVES

Dilworth T. Rogers, Summit, and John P. McDermott, Springfield, N. J., assignors to Esso Research and Engineering Company, a corporation of Delaware No Drawing. Application July 18, 1951,
Serial No. 237,477

15 Claims. (Cl. 252—46.7)

The present invention relates to lubricating oil additives and compositions which are suitable particularly for the reduction or inhibition of oxidation in lubricating oil and related organic compositions which are normally susceptible to oxidation.

As is well known in the prior art many organic materials are subject to oxidative deterioration in storage and in use. Hydrocarbon oils, which constitute a large and important class of organic materials are particularly subject to such deterioration. The same is true also of the naturally occurring fatty oils, derived from animal or vegetable sources, and of related organic material such as synthetic esters, for example long chain fatty esters of dibasic acids and the like.

Oxidation of these organic materials, particularly liquid organic materials and especially oils which are used for the lubrication of machinery and the like, constitutes a serious problem. Continued satisfactory functioning of machinery requires the continuous presence of an oil film of proper consistency and viscosity at points where metal contacts metal under pressure. When gums, sludges, and other products of oxidation are formed they interfere seriously with the preservation of lubricating films as is well known in the art.

Various types of oxidation inhibitors have been proposed in the past with varying degrees of success.

According to the present invention a new type of oxidation inhibitor which is particularly effective in lubricating oils, particularly mineral base oils, may be prepared by reacting a phenyl type silanol, e. g. phenyl or alkylated phenyl silanols, and a phosphorus sulfide at a suitable temperature for a suitable period of time. These aromatic compounds are more readily prepared and are more stable than the corresponding aliphatic compounds.

In particular it is preferred to use a reaction temperature within the range of about 150 to 250° C. A specific preferred range is about 160 to 200° C., especially for the type of aryl-silanol preferred at present which is one of the multi-aryl silanols such as diphenylsilanol, triphenylsilanol, and corresponding alkyl phenyl-silanols, e. g. the octyl phenyl silanols, tolyl silanols, etc.

In general the hydrocarbon derivatives of silanol, especially the mono-, di-, and tri-phenyl or alkylated phenyl silanols are particularly suitable. These may be reacted with any of the phosphorus sulfides such as $P_4S_3$, $P_2S_5$ or $P_4S_7$, the latter two being specifically preferred.

The reaction products obtained as above are usually in the form of heavy viscous oils, or light tacky or waxy solids which can be dissolved in small proportions in hydrocarbon oils, or in natural fatty oils, or synthetic esters of the type mentioned above.

In general, proportions of the reaction products suitable for inhibiting oxidation range within the limits of 0.01 up to about 1 or 2% by weight based on the total composition. Proportions as low as .001% and as high as 10% may be utilized in some cases. These reaction products, or anti-oxidants as they may be termed, may be used alone or in combination with other conventional additives such as other anti-oxidants, thickening agents, viscosity improvers, pour point depressants, metal deactivators, and the like as will be obvious to those skilled in the art. They may be used either in oils or in greases which contain major proportions of lubricating oils. They are particularly satisfactory for mineral base oils of typical internal combustion engine crank case grade. The invention will be understood more fully by reference to the following specific examples.

EXAMPLE I

DIPHENYLSILANEDIOL-$P_2S_5$ REACTION PRODUCT 21.6 g. (0.1 mol) of diphenylsilanediol contained in a 150 ml. Erlenmeyer flask was melted (160° C.) after which 4.4 g. (0.02 mol.) of $P_2S_5$ was added in small portions over a period of about 45 minutes, the reaction temperature being maintained at 170°–190° C. during this time. A vigorous evolution of $H_2S$ occurred after each addition of $P_2S_5$. Upon cooling a dark solid was obtained. The product was dissolved in $CCl_4$ and filtered to remove a small amount of insoluble material. Evaporation of the solvent yielded a brown tacky solid, which upon analysis was found to contain 11.2% Si, 4.2% P, and 5.0% S.

The effectiveness of this type of compound is illustrated by the following oxidation and engine test data:

*0.25 wt. percent of active ingredients in an extracted Mid-Continent SAE–20 oil*

| Additive | 4 Hr. S. O. D. Life (Hours to lose 100 mg./25 sq. cm. of Cu-Pb Bearing |
|---|---|
| None | 8 |
| Example I Reaction Product | 19 |

The S. O. D. life test is a well known test where segments of bearings of 25 sq. cm. total area, and of approximately equal size and shape are weighed and placed in 500 cc. of the oil which is maintained at a temperature of 325° F. Every four hours the bearing segment is reweighed until it has lost 100 mg. weight, due to corrosion. The time required is the "corrosion life" of the bearing.

The above product was tested also in a standard Lauson engine to determine the effect of the additive upon corrosion of copper-lead bearings. The Lauson test is a standard one, well known in the art, and need not be described in detail. The effectiveness of the inhibitor is measured in milligrams of bearing weight loss over the test period of 20 hours while the engine is operated at a temperature of 300° F. The following data show the improvement of a solvent extracted oil containing 0.25% by weight of the reaction product of Example I as compared with the uninhibited oil. The uninhibited oil showed a bearing loss of 107 mg. whereas the inhibited oil showed a weight loss in the test of only 25 mg.

EXAMPLE II

TRIPHENYLSILANOL-$P_2S_5$ REACTION PRODUCT 55.3 g. (0.2 mol) of triphenylsilanol contained in a 250 ml. beaker was melted (145° C.) after which 11.1 g. (0.05 mol) of $P_2S_5$ was added in small portions over a period of 35 minutes with rapid stirring. During this step the temperature rose to 175° C. and considerable $H_2S$ was evolved. The reaction mixture was stirred at 170–180° C. for an additional 45 minutes after which it was allowed to cool to room temperature. The reaction product was dissolved in $CCl_4$ and filtered to remove a small amount of unreacted $P_2S_5$. Evaporation of the solvent yielded a light brown tacky solid which analyzed 2.7% P, 4.5% S, and 4.8% Si.

EXAMPLE III

TRIPHENYLSILANOL-$P_4S_7$ REACTION PRODUCT

This reaction was carried out in the same manner as described in Example II using 66.4 g. (0.24 mol.) of triphenylsilanol and 10.4 g. (0.03 mol.) of $P_4S_7$. A waxy solid was obtained which analyzed 2.6% P, 2.1% S, and 7.2% Si.

*0.25 wt. percent of active ingredient in an extracted Mid-Continent SAE–20 oil*

| Additive | 4 Hr. S. O. D. Life Hours to Lose 100 mg./25 sq. cm. of Cu-Pb Bearing |
|---|---|
| None | 8 |
| Example II Reaction Product | 18 |
| Example III Reaction Product | 17 |

While the above data are limited to the di- and triphenylsilanols it will be understood that the other aryl silanols previously mentioned, especially the di- and tri- $C_2$ to $C_8$ alkyl phenyl silanols may be used. In general, these behave similarly. The expression "phenyl type silanols" is intended to cover all of these compounds while excluding silanols free of phenyl groups.

The exact nature of the reaction between the aryl type silanol and the phosphorus sulfide is not completely understood but presumably the phosphorus sulfide reacts with these materials to form products analogous to the thiophosphates, or di-thiophosphates which are produced by reacting phosphorus sulfides with ordinary aliphatic alcohols.

While the invention particularly contemplates the use of the phenyl type silanol monomers the dimers, trimers and even higher polymers of the silanols may also be used for some purposes. They are less effective than the monomers because they tend to make products which are highly oil insoluble but, to the extent that oil solubility can be maintained satisfactorily, the dimers and higher polymers have some utility.

It will be understood that various related compositions may be substituted and that the reaction conditions may be varied within reasonable limits as will be understood by those skilled in the art. In general, it is preferred to carry the reactions to substantial completion by maintaining the reaction temperature for a period sufficiently long that $H_2S$ evolution has practically ceased.

What is claimed is:

1. The reaction product of an aryl silanol in which at least two silicon bonds are occupied by aryl groups, the remainder of the silicon bonds being occupied by hydroxy groups and a phosphorus sulfide reacted to substantial completion at a temperature within the range of 150 to 250° C.

2. Product according to claim 1 the silanol is selected from the group consisting of di- and tri-phenyl and di- and tri-$C_2$-$C_8$ alkyl phenyl.

3. The reaction product of a diaryl silanol in which two silicon bonds are occupied by hydroxy groups and $P_2S_5$ carried to substantial completion at a temperature within the temperature range of 150 to 250° C.

4. A composition comprising a major proportion of an oily vehicle selected from the group consisting of mineral oils, natural fatty oils and synthetic ester oils and containing 0.001 to 5% by weight, based on the total composition, of the reaction product of an arylsilanol in which at least two silicon bonds are occupied by aryl groups, the remainder of the silicon bonds being occupied by hydroxy groups and a phosphorus sulfide reacted to substantial completion at a temperature within the range of 150 to 250° C.

5. A composition comprising a major proportion of an oily vehicle selected from the group consisting of mineral oils, natural fatty oils and synthetic ester oils and containing 0.001 to 5% by weight, based on the total composition of the reaction product of a diaryl silanol in which at least two silicon bonds are occupied by hydroxy groups and $P_2S_5$ carried to substantial completion at a temperature within the temperature range of 150 to 250° C.

6. Composition according to claim 5 wherein the diaryl silanol is a diphenyl silanol.

7. The reaction product of a multi-phenyl silanol in which all silicon bonds are occupied by phenyl and hydroxy groups with a phosphorus sulfide carried to substantial completion at a temperature within the range of 150 to 250° C.

8. An oil composition comprising a major proportion of liquid organic oil of about lubricating oil viscosity selected from the group consisting of mineral oils, natural fatty oils and synthetic ester oils and a minor proportion of the reaction product of a multi-phenyl silanol in which all silicon bonds are occupied by phenyl and hydroxy groups with a phosphorus sulfide carried to substantial completion at a temperature within the range of 150 to 250° C.

9. Composition according to claim 8 wherein the oil is mineral base oil.

10. Composition according to claim 8 wherein the oil is a natural fatty oil.

11. Product according to claim 7 wherein the silanol is diphenyl silanol.

12. Product according to claim 7 wherein the silanol is triphenyl silanol.

13. The process of preparing an oxidation inhibiting material which comprises reacting a silanol selected from the group consisting of multi-phenyl and di- and tri-$C_2$-$C_8$ alkyl phenyl silanols in which all silicon bonds are occupied by phenyl-type and hydroxy groups with a phosphorus sulfide at a temperature within the range of 150 to 250° C. until reaction is substantially complete.

14. Process according to claim 13 wherein the phosphorus sulfide is $P_2S_5$.

15. Process according to claim 13 wherein the phosphorus sulfide is $P_4S_7$.

No references cited.